United States Patent Office 3,396,655
Patented Aug. 13, 1968

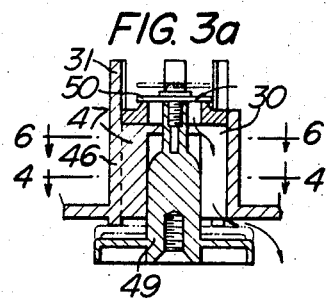
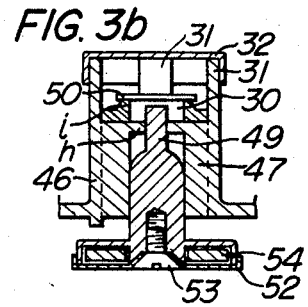
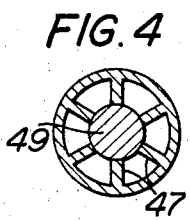
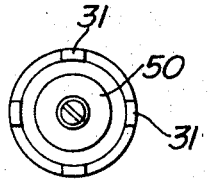
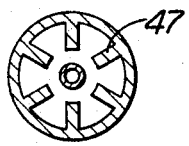
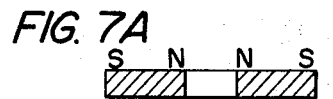
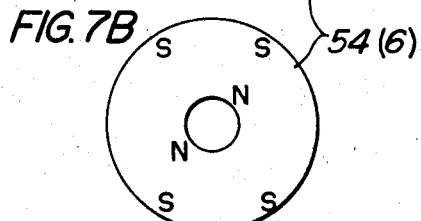
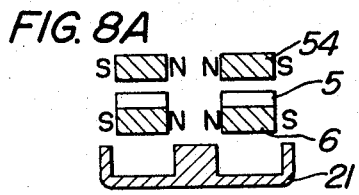
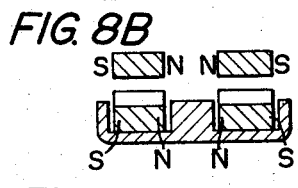
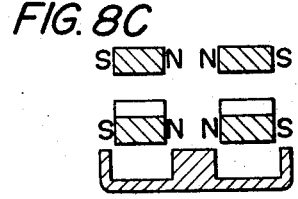

3,396,655
AUTOMATIC ELECTRIC EGG COOKER
Akinobu Yoshida, Osaka, Tomio Ishikawa, Nishinomiya-shi, and Yoshiaki Sano, Kobe, Japan, assignors to Matsushita Electric Industrial Co., Ltd., Osaka, Japan
Filed Dec. 27, 1966, Ser. No. 605,051
Claims priority, application Japan, Dec. 29, 1965, 41/201
6 Claims. (Cl. 99—331)

ABSTRACT OF THE DISCLOSURE

An automatic egg cooker in which, upon completion of the desired amount of cooking, the eggs are rapidly cooled to prevent overcooking. The cooker includes a boiling pot having electrical heating means, means to control the desired cooking time, means to hold eggs in the pot and a reservoir for cooling water which is released into the cooking pot at the end of the desired cooking time. The cooling water is released by a magnetically operated valve including a permanent magnet and a ferrite having a predetermined Curie point related to the temperature of the cooking pot.

---

An electric automatic egg cooker which is an improvement of that disclosed in U.S. Patent No. 3,147,689, and which is provided with boiled-egg-cooling water injection valve adapted to be opened and closed by making use of a change in magnetic characteristics of a ferrite having a predetermined Curie point due to temperature change of the boiling pot of the cooker.

The present invention relates to an improved automatic electric egg cooker and more particularly to such an egg cooker which is arranged such that egg cooling water is automatically poured into an egg boiling pot in a positive manner by a simple mechanism, thereby to obtained eggs of a desired degree of cooking.

To cook eggs in conventionally known automatic electric egg cookers, it has been practiced to pour in an egg boiling pot heating water in an amount as required to boil the eggs to a desired degree of hardness and an egg supporting structure with eggs mounted thereon, close the boiling pot with a cover and then energize an electric heater fitted on the outer bottom surface of the boiling pot to convert the heating water into steam for heating the eggs. As the heating of the boiling pot proceeds, the heating water is vaporized until no heating water remains in the pot. The pot temperature is rapidly raised thereafter and thus a thermostatic switch is actuated to interrupt the energization of the heater and therefore heating of the eggs, said thermostatic switch being mounted adjacent the heater and adapted to break the heater circuit in response to said elevated temperature or a predetermined temperature and not to reclose the circuit unless actuated by an external force.

With such conventional forms of automatic electric egg cooker, if the eggs are left in the boiling pot successively after the actuation of the thermostatic switch without taking them out immediately thereafter, the eggs would be cooked to a hardness higher than desired as a result of further coagulation of the egg content by the heat stored in the eggs themselves, the thermal inertia of the heater and the boiling pot, the heat content of the steam enclosing the eggs and other different heat accumulations.

For instance, when half-boiled eggs are desired, even if a proper amount of heating water is charged for obtaining such half-boiled eggs, the eggs obtained will have an undesirably high hardness due to continued coagulation of the egg content by various heat accumulation effects as mentioned above, if the eggs are left in the pot after the thermostatic switch has been actuated. Similiarly, when the egg cooker is set for hard-boiled eggs, the eggs obtained will be subjected to continued heating due to the various heat accumulation effects even after the actuation of the thermostatic switch, if the eggs are left in the boiling pot. As a result, the egg white comes to produce hydrogen sulfide, which, upon contact with the egg yoke, gives to the surface of said egg yoke a dark green color while emitting an offensive odor. This is undesirable, for it dimishes the appetite of persons served.

It has thus been difficult, with the conventional forms of automatic electric egg cooker, to obtain eggs cooked to a desired degree of hardness. In order to obtain boiled eggs of a desired hardness with such conventional cookers, it has been necessary either to take the boiled eggs out of the boiling pot or to pour cooling water into the pot immediately after the heating element has been deenergized. For this purpose, the user is required to watch the operation of the cooker so that he may perform the egg cooling procedure immediately upon the termination of heater operation. Thus, the conventional cooker is inconvenient in use requiring continued attendance of the user.

In order to overcome the foregoing drawback of the conventional automatic electric egg cookers, there have recently been proposed several cookers which are arranged such that, when eggs have been boiled to a desired degree, a heating element is deenergized and simultaneously cooling water is poured into an egg boiling pot from a water tank provided separately from the boiling pot for cooling the boiled eggs. However, none of them are entirely satisfactory because they are complicated in construction and further it is impossible to obtain positive operation of the cooker. The present invention, therefore, has for its object the provision of an improved and novel automatic electric egg cooker in which cooling water is automatically poured into an egg boiling pot in a positive manner by a simple mechanism, thereby to obtain eggs of a desired degree of cooking.

In order that the present invention may be more clearly understood and readily carried into effect, reference may now be had to the accompanying drawings in which the present invention is illustrated by way of example and in which:

FIG. 3a is a cross section of valve means provided in the inventive automatic electric egg cooker, and FIG. 3b is another embodiment of the same;

FIG. 4 is a cross section taken along the line 4—4 of FIG. 3a;

FIG. 5 is a top view of the valve means shown in FIG. 3a;

FIG. 6 is a cross section taken along the line 6—6 of FIG. 3a;

FIGS. 7a and 7b are a cross section and a plan view, respectively, of the magnet mounted in the valve means; and FIGS. 8a, 8b and 8c respectively are cross sections illustrating the relative positions of a ferrite, magnet and by-pass plate.

Figure 1:
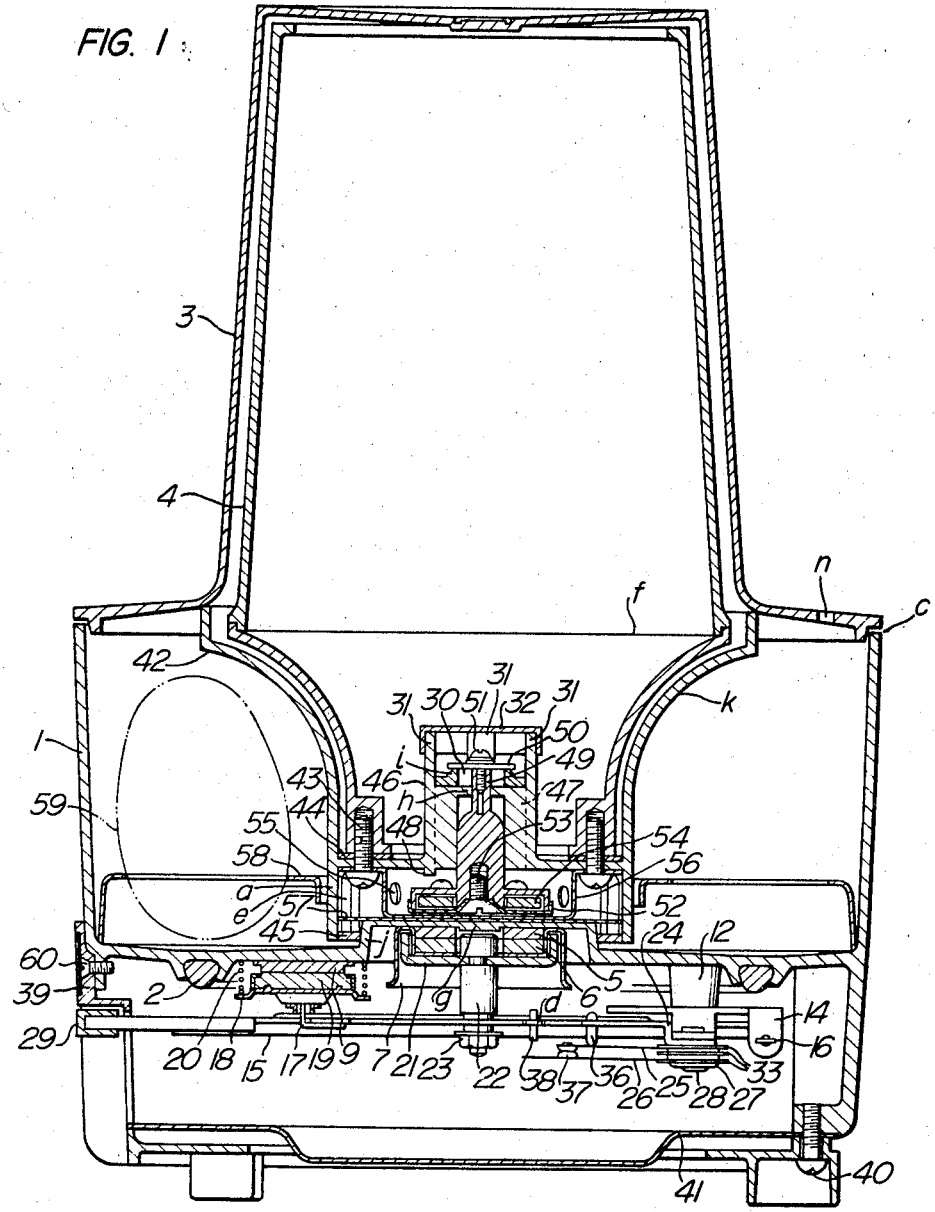
FIG. 1 is a cross section of an automatic electric egg cooker embodying the present invention.
Figure 2:
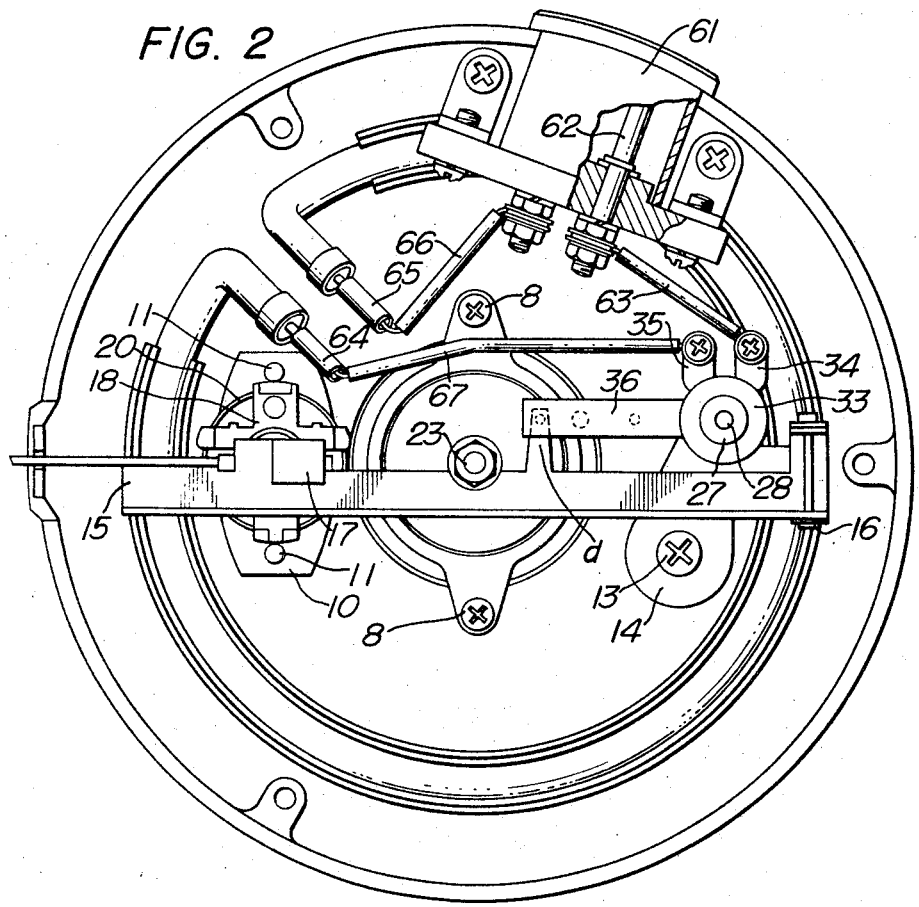
FIG. 2 is a bottom view of the automatic electric egg cooker shown in FIG. 1 with the base plate thereof removed.

Referring to the drawings, a cylindrical boiling pot 1 is formed of a material, such as aluminum, having a good thermal conductivity and is provided on the outer bottom surface thereof with a heater element 2. The top opening of the boiling pot 1 is closed with a hood-like cover 3 which is removably mounted thereon. A water tank 4 is provided within the space defined by the boiling pot 1 and the cover 3. This water tank is composed of an upper section of substantially the same configuration as the cover 3 having its top end open and a lower section of an inverted cone-shaped configuration having valve means provided at the bottom thereof, said upper and lower sections being joined as indicated at f.

The bottom of the boiling pot 1 is raised at its center as shown at j and on the underside of this raised portion j are provided a ferrite 5 having a Curie point of the order of 60° C. and a magnet 6, which are put together one on another in a cup-shaped fitting 7 having a grooved portion formed around the periphery thereof and secured to the boiling pot by means of screws 8, 8. The ferrite 5 and the magnet 6 respectively have a doughnut-shaped configuration, while the fitting 7 is formed at its center with an aperture. On the outer bottom surface of the boiling pot 1 is also provided adjacent to the heater element 2 another ferrite 9 which has a Curie point of the order of 115° C. and is retained in place by a holder 10 which is caulked by projections formed on said surface of the boiling pot 1.

Also provided on the outer bottom surface of the boiling pot 1 is a boss 12 which is extending downwardly from said surface and has a frame 14 secured thereto by a screw 13. A lever 15 extending outwardly from the center of the boiling pot 1 has one end pivotally connected to the frame 14 by a pivot pin 16. At a portion of the lever 15 opposite to the ferrite 9 is provided a magnet 19 which is mounted on said lever by way of an L-shaped fitting 17 and a magnet holder 18 cooperating with said L-shaped fitting 17, in such a manner that said magnet 19 abuts against the ferrite 9. The magnet 19 is urged downwardly under the bias of a spring 20 so that said magnet is disconnected from the ferrite 9 at the Curie point of the latter. In order to facilitate a close contact between the magnet 19 and the ferrite 9 under the magnetic attraction of the magnet, a space is provided between the L-shaped fitting 17 and the magnet holder 18.

The lever 15 carries at substantially the center thereof a cup-shaped by-pass plate 21 which has a U-shaped cross section and is secured to said lever through a support rod 22 by means of a nut 23 in connecting relation with the ferrite 5, magnet 6 and fitting 7, the arrangement being such that said by-pass plate 21 is received in the grooved portion of the fitting 7, so that it will not be dislodged from said fitting upon vertical movement of the lever 15 over its full stroke and, when the lever 15 is at the lower end of its stroke, the top edge of the magnet 6 is located downwardly of the under surface of the magnet 6.

The frame 14 further carries thereon a fitting 24 for an insulator, a fixed contact strip 25 and a movable contact strip 26, all of which are extending longitudinally of and integrally secured to said frame in superposed relation by means of washers 27 and a rivet 28 with an insulator 33 interposed therebetween, said contact strips 25 and 26 being in electrical connection with terminals 34 and 35 respectively. The fixed contact strip 25 is urged downwardly by a synthetic resin-made insulator 36 provided at the free end extremity of the fitting 24, to thereby keep a contact 37 in closed position. The insulator 36 is made of a thermoplastic resin, such as polyamide, and adapted to be softened when the environmental temperature is elevated to 180–200° C., so that the insulator is deformed at that temperature by the bias of the fixed contact strip 25 to bring the contact 37 into open position, thus assuring safe operation of the cooker. The movable contact strip 26 is constantly urged towards the fixed contact strip 25 and its extended free end is opposed by an insulator 38 which is carried on a lug d formed at a portion of the lever 15.

Beneath the egg boiling pot 1, there is provided a scale base 39 including integral legs and a scale plate and being fitted to the bottom of the boiling pot 1 by screws 40, 60, together with a bottom plate 41, in such a manner as to enclose the aforementioned operational elements therein. The operating end 29 of the lever 15 is extending outwardly through the scale base 39 so as to be operated from the outside.

The valve means for the water tank 4 includes a valve seat structure 42 having a flare k of substantially the same configuration as the bottom section of the water tank 4. This valve seat structure 42 is arranged at the bottom of the water tank 4 in concentrical relation therewith and is integrally fitted to said water tank by means of screws 43 in such a manner as to close the bottom opening of the water tank. In order to obtain a water-tight connection between the water tank 4 and the valve seat structure 42, a packing 44 is disposed therebetween and, to further enhance the water sealing effect between the packing and the water tank, a ridge is formed on the bottom end surface of the water tank 4 along the entire periphery thereof. The upper edge of the flare k of the valve seat structure 42 is in contact with the inner wall surface of the cover 3 at a level higher than the upper edge of the boiling pot 1, while the bottom edge of the same is partially extended further downwardly to form a plurality of lugs a and each of the lugs a is provided at its end with an inwardly extending rocking motion preventive leg 45 which is guided by the peripheral wall of the central raised portion of the boiling pot 1 to thereby center said valve seat structure.

The valve seat structure 42 is formed at the center thereof with a valve seat body 56 extending vertically upwardly into the water tank 4. A plurality of radial fins 47 are provided on the inner wall surface of the valve seat body and the space between the top ends of adjacent radial fins 47 is closed so as to define a valve port 30. The upper edge of the valve seat body 46 is partially extended further upwardly to form a plurality of lugs 31, with a valve cover 32 fitted thereon, while the bottom edge of the same is formed with a plurality of projections 48 for the purpose of preventing a valve rod 49, which will be described later, from being in intimate contact with said bottom edge when the valve rod 49 is in the raised position. In the center of the valve seat body 46 is fitted the valve rod 49 for free vertical movement therein. The valve rod 49 has a rubber valve element 50 secured to the top end thereof by a screw 51, which is adapted to open and close the valve port 30, and a magnet 54 fixed to the bottom end thereof by means of a fitting 52 and a screw 53. The magnet 54 is arranged with respect to the magnet 6 in such a manner that the poles are located on the same side and is disposed interior of a magnet cover 56 which has a plurality of holes 55 formed in the peripheral wall thereof and is fitted to the water tank 4 together with the valve seat structure 42. Provided below the magnet cover 56 is a heat-shielding element 57, such as a rubber sheet, which is prevented from coming off the valve seat structure 42 by the rocking motion preventive legs 45. Such being the arrangement, the magnet cover 56 is brought in intimate contact with the upper surface of the raised portion of the boiling pot 1 through the heat-shielding element 57 when the water tank 4 is mounted on the boiling pot 1. In this case, the valve seat structure 42 is spaced from the bottom surface of the boiling pot 1.

As described above, the valve rod 49 and the valve element 50 are integrally secured to each other by means of the screw 51. In this case, however, a water-tight sealing at the valve seat portion i cannot be obtained unless the valve rod 49 and the valve element 50 are held exactly at right angles to each other. In addition, when the valve element 50 is made of such a material as rubber, the valve element tends to be deformed due to the weights of the valve rod 49 and the parts carried thereby on said valve element. Such problems may be avoided by not securing the valve element 50 to the valve rod 49 so as to enable the valve element 50 to be pushed upwardly by the valve rod 50 only when the switches are in the off position, in which case the valve element 50 is closed by making use of its own weight and the pressure of water in the water tank. With such arrangement, a better result can be obtained by forming the valve element of a sheet metal having a high degree of surface flatness.

It is of particular importance for obtaining a positive operation of the inventive egg cooker that the two magnets 54 and 6 are aligned axially. In order to achieve this, according to an aspect of this invention, the rocking motion preventive legs 45 are provided on the valve seat structure 42 for engagement with the raised portion $j$ at the center of the boiling pot 1 and the valve seat body 46 of the valve seat structure 42 is located at the center of said rocking motion preventive legs 45 and further the valve rod 49 is arranged for sliding movement in the columnar air space defined by the fins 47 of the valve seat body 46. Because of such arrangement, it will be understood that the magnet 54 fitted to the valve rod 49 is always located at the center of the valve seat structure 42. On the other hand, the ferrite 5 and the magnet 6, fitted to the boiling pot 6, are centered by a projection $g$ formed at the center of the outer bottom surface of the boiling pot 1. It will be appreciated, therefore, thot the magnet 54 which is centered by the rocking motion preventive legs 45 and the magnet 6 and ferrite 5 which are centered by the projection $g$ formed on the back side of the raised portion $j$ of the boiling pot 1 are placed in axial alignment with each other and the axial alignment is maintained by the action of the rocking motion preventive legs 45, even after mounting or removal of the water tank 4 in and from the boiling pot, ensuring positive operation of the cooker.

A smaller diameter portion of the valve rod 49 formed near the valve element 50 is prevented from rocking by fins $h$ projecting from the inner wall of the valve seat body 46, and the vertical movement of the magnet 54 is guided thereby. These fins $h$ serve the same purpose as that of the fins 47, enabling the valve rod 49 to operate always in a direction at right angles to the valve port 30, which is an essential requirement for the prevention of water leakage.

According to another aspect of the invention, a valve seat portion $i$ is formed of a resilient material, such as rubber, in particular, so as to obtain an uninterrupted engagement between the valve element 50 and the valve seat portion $i$. Obviously, this is effective in preventing water leakage and thereby assuring positive operation of the valve means, in the light of the fact that the pressure of water in the water tank is low and moreover the weights of the valve rod 49 and the magnet 54 are the only pressure acting on the valve element to close the valve and under such condition unsatisfactory engagement of the valve element with the valve seat portion provides a great cause of water leakage. According to the experiments, it has been confirmed that the effect of the valve obtained from the formation of both of the valve element and the valve seat portion of a resilient material, such as rubber, is several times greater than that obtainable from the formation of only the valve element of such resilient material.

An egg supporting structure 58 with eggs 59 mounted thereon is placed in the boiling pot 1 peripherally of the water tank 4. A plug socket 61 is fitted in the bottom portion of the boiling pot providing for connection with a power source. One of the plug pins 62 of the plug socket 61 is connected to the terminal 34 through a lead wire 63, while the terminal 35 is connected through a lead wire 67 to a terminal 64 of the heater element 2 which has the other terminal 65 connected to the other plug pin of the plug socket through a lead wire 66.

The inventive automatic electric egg cooker constructed as described above will operate in a manner described below. First of all, the eggs 59 are mounted on the egg supporting structure 58 placed in the boiling pot 1 and water is charged in the boiling pot 1 in an amount as required for obtaining boiled eggs of a desired hardness. The amount of water, which is previously measured by a separate measuring cup or the time, is the factor which will determine the hardness of the resulting boiled eggs or a period of time during which a current is conducted through the heater element. This means that the current is conducted until that amount of water has all been evaporated. Then the water tank 4 is filled with water and mounted in the boiling pot 1 so that the rocking motion preventive legs 45 provided at the lower edge of the water tank may engage the peripheral wall surface of the central raised portion of the boiling pot 1, and finally the boiling pot is closed with the cover 3.

A plug leading from a power source is engaged with the plug pins 62 and the operating end 29 of the lever 15 is moved upwardly, whereupon the magnet 19 is attracted by the ferrite 9 and simultaneously the by-pass plate 21 is carried upwardly on the lever to shield the flux of the magnet 6 and the contact 37 is closed by the upward movement of the insulator 38. Therefore, a current flows from the plug pin 62 through the lead wire 63, terminal 34, fixed contact strip 25, contact 37, movable contact strip 26, terminal 35, lead wire 67, heater terminal 64, heater element 2, heater terminal 65 and lead wire 66 in the order mentioned, and thus the boiling pot 1 is heated by the heater element 2. When the boiling pot is heated, the water therein is evaporated to heat the eggs 59. The resulting steam, after having heated the eggs, is dispersed into the atmosphere through a gap $c$ provided between the cover 2 and the boiling pot 1 and an aperture $n$ formed in the cover 2 and finally the water in the boiling pot 1 is exhausted. Thereafter, the temperature of the boiling pot 1 rises rapidly, heating the ferrite 9. When the ferrite 9 is heated to a temperature above the Curie point (which is about 115° C.), it loses magnetic characteristics, so that the magnet 19 is moved downwardly by the bias of the spring 20, causing the lever 15 to make a downward swinging movement about the pin 16. The movable contact strip 26 is, therefore, depressed by the insulator 38 placing the contact 37 into open position, and the by-pass plate 21 is also moved downward simultaneously.

Now, the operative correlation among the magnet 54, ferrite 5, magnet 6 and by-pass plate 21, during this operation, will be explained with reference to FIG. 8. When the water tank 4 is mounted in the boiling pot 1, the magnets 54 and 6 attract each other due to the presence of the ferrite 5 therebetween, as shown in FIG. 8(A), with the result that the valve port 30 is closed by the valve element 50 to prevent the water in the water tank 4 from flowing outside said water tank therethrough. When the lever 15 is operated to close the contact 37, the by-pass plate 21 is moved upwardly to embrace the ferrite 5 and magnet 6 in a manner shown in FIG. 8(B) and thus the flux of the magnet 6 is shielded. In this state, the mutual magnetic attraction between the magnets 54 and 6 undergoes no change by virtue of the by-pass plate 21 even when the temperature of the ferrite is elevated to exceed its Curie point along with the temperature elevation of the boiling pot resulting from heating. Now, when the by-pass plate 21 is lowered upon swinging movement of the lever 15 under the action of the spring 20, the contact 37 is opened and, at the same time, the magnet 54 is moved upwardly as shown in FIG. 8(C) by a repulsive force acting between it and the ferrite 5, since the ferrite 5 is heated at a temperature above its Curie point.

Consequently, the valve rod 49 shown in FIG. 1 is also moved upwardly along with the magnet 54, opening the valve element 50. The water in the water tank 4, therefore, is allowed to flow through the valve port 30 and the space between the fins 47 of the valve seat body 46 into the magnet cover 56 and thence flows through the holes 55 and the spaces $e$ formed in the bottom end of the valve seat structure 42 into the boiling pot 1 where it cools the boiled eggs 59.

As will be apparent from FIG. 1, the water in the water tank 4 will not be heated during the egg boiling process. Namely, although the flare $k$ of the valve seat structure 42 is heated by the steam generated in the boiling pot 1, the water tank 4 is thermally insulated from the flare $k$ by the space provided therebetween. Furthermore, the upper edge of the flare $k$ is in contact with the cover 3 at a level higher than the upper edge of the boiling pot 1 defining a gap between it and the cover 3. Due to such arrangement, it is possible to proceed with the egg boiling process by the steam generated in the boiling pot 1, without directly heating the water tank 4, although the cover 3 and the flare $k$ of the valve seat structure 42 are heated by the steam. The steam generated in the boiling pot 1 is discharged into the atmosphere through the gap $c$ and the aperture $n$. Since the water in the water tank 4 is thus maintained at substantially the same temperature as it was before the heating of the boiling pot, positive cooling of the boiled eggs can be obtained.

Since ferrite 5 has a Curie point of about 60° C., it regains magnetic characteristics upon being cooled to a temperature below said Curie point, a while after the water in the water tank 4 has been drawn into the pot, whereupon the magnets 54 and 6 attract each other and hence the valve port 30 is again closed by the valve element 50.

Upon flowing into the boiling pot 1, the temperature of the cooling water, which was initially at about 15° C., is elevated to about 30 to 40° C. This means that, as the boiling pot 1 is cooled by the cooling water, the ferrite 5 is also cooled simultaneously. In this case, since the ferrite 5 has a Curie point of about 60° C., it is possible that the ferrite 5 regains magnetic characteristics causing the closure of the valve, even before the water tank 4 has been emptied. In order to maintain the temperature of the ferrite 5 above its Curie point or to delay the cooling of the ferrite 5, therefore, the heat-shielding element 57 is provided above the ferrite 5 as described previously. By the provision of the heat-shielding element 57, while the boiling pot 1 is cooled relatively rapidly by the cooling water, the cooling speed of the ferrite 5 is slowed down remarkably, so that the ferrite 5 is cooled to the temperature of water in the boiling pot and attracts the magnet 54, only a while after the entire cooling water has flown down from the water tank. Such an arrangement also contributes to positive cooling of the boiled egg.

As is apparent from the foregoing description, it is possible, with egg cooker according to the present invention, to avoid undesirable hardening of boiled eggs by cooling water which is poured into the boiling pot automatically upon completion of the cooking and thereby obtain eggs boiled of a desired degree of hardness, without requiring any complicated operation as has been required with conventional egg cookers. The inventive egg cooker is extremely easy in handling, is simple in construction and yet operates in a positive manner, by virtue of the facts that the valve means provided in the water tank and the operating means for the egg cooker provided in the boiling pot are completely separated from each other mechanically, there being no parts directly connecting said means with each other, and that said means are operatively connected by making use of repulsive force of magnet. Furthermore, the inventive egg cooker does not require any special adjustment work during the manufacturing process thereof but only requires a simple assembling work, because any dimensional effort possibly involved therein is compensated by the flux of the magnet. With the inventive automatic electric egg cooker having a number of merits as set forth above, eggs of a desired hardness can be obtained automatically only by adjusting the amount of heating water to be poured therein initially.

What is claimed is:

1. An automatic electric egg cooker, comprising a boiling pot adapted to accommodate water and eggs, electric heater means for heating said boiling pot, an automatic switch to automatically interrupt the heating of the eggs by sensing the elevated temperature of the boiling pot when said water has been evaporated entirely, a water tank for accommodating cooling water for cooling the boiled eggs, a ferrite having a Curie piont lower than the operating temperature of said switch, a magnet having its flux bypassed by said ferrite and fitted to the outer bottom surface of said boiling pot together with said ferrite, a magnet arranged opposite to said first magnet in such a manner that the same poles are located on the same side and operatively associated with a valve in said water tank, and a by-pass plate adapted to by-pass the flux of said second magnet upon closure of said switch, the arrangement being such that, when the switch is opened upon completion of cooking of the eggs, the valve is opened by virtue of the repulsive force acting between said magnets to thereby allow the cooling water in the water tank to flow into the boiling pot.

2. An automatic electric egg cooker, comprising a boiling pot having a raised portion formed at the center of the bottom surface thereof and a projection formed at the center on the back side of said raised portion, electric heater means for heating said boiling pot, an automatic switch to automatically interrupt the heating of the eggs by sensing the elevated temperature of the boiling pot when water in said boiling pot has been evaporated entirely, a water tank for accommodating cooling water for cooling the boiled eggs, valve means arranged concentrically of said raised portion of the boiling pot by being guided thereby when said water tank is mounted in said boiling pot, a ferrite having a Curie point lower than the operating temperature of said switch, a magnet having its flux by-passed by said ferrite and fitted to the outer bottom surface of said boiling pot together with said ferrite by being guided by said projection on the boiling pot, a magnet arranged opposite to said first magnet in such a manner that the same poles are located on the same side and operatively associated with a valve in said valve means, and a by-pass plate adapted to by-pass the flux of said second magnet upon closure of said switch, the arrangement being such that, when the switch is opened upon completion of the cooking of the eggs, the valve is opened by virtue of the repulsive force acting between said magnets to thereby allow the cooling water in the water tank to flow into the boiling pot.

3. An automatic electric egg cooker, comprising a boiling pot adapted to accommodate water and eggs, electric heater means for heating said boiling pot, an automatic switch to automatically interrupt the heating of the eggs by sensing the elevated temperature of the boiling pot when said water has been evaporated entirely, a water tank for accommodating cooling water for cooling the boiled eggs, valve means arranged below said water tank and having a flare with its top edge abutting against the inner surface of a cover for the boiling pot, a ferrite having a Curie point lower than the operating temperature of said switch, a magnet having its flux by-passed by said ferrite and fitted to the outer bottom surface of said boiling pot together with said ferrite, a magnet arranged opposite to said first magnet in such a manner that the same poles are located on the same side and operatively associated with a valve in said valve means, and a by-pass plate adapted to by-pass the flux of said second magnet upon closure of said switch, the arrangement being such that, when the switch is opened upon completion of cooking of the eggs, the valve is opened by virtue of the repulsive force acting between said magnets to allow the cooling water in the water tank to flow into the boiling pot.

4. An automatic electric egg cooker, comprising a boiling pot adapted to accommodate water and eggs, electric heater means for heating said boiling pot, an automatic switch to automatically interrupt the heating of the eggs by sensing the elevated temperature of the boiling pot when said water has been evaporated entirely, a water tank for accommodating cooling water for cooling the boiled eggs, a ferrite having a Curie point lower than the operating temperature of said switch, a magnet having its flux by-passed by said ferrite and fitted to the outer bottom surface of said boiling pot together with said ferrite, a magnet arranged opposite to said first magnet in such a manner that the same poles are located on the same side and operatively associated with a valve in said water tank, a by-pass plate adapted to by-pass the flux of said second magnet upon closure of said switch, and a heat-shielding element adapted to cover the surface of the boiling pot above said ferrite when said water tank is mounted on said boiling pot, the arrangement being such that, when the switch is opened upon completion of cooking of the eggs, the valve is opened by virtue of the repulsive force acting between said magnets to thereby allow the cooling water in the water tank to flow into the boiling pot.

5. An automatic electric egg cooker, comprising a boiling pot adapted to accommodate water and eggs, electric heater means for heating said boiling pot, an automatic switch to automatically interrupt the heating of the eggs by sensing the elevated temperature of the boiling pot when said water has been evaporated entirely, a water tank for accommodating cooling water for cooling the boiled eggs, valve means having a valve and valve seat portions formed of a resilient material and mounted in said water tank, a ferrite having a Curie point lower than the operating temperature of said switch, a magnet having its flux by-passed by said ferrite and fitted to the outer bottom surface of said boiling pot together with said ferrite, a magnet arranged opposite to said first magnet in such a manner that the same poles are located on the same side and operatively associated with the valve in the water tank, and a by-pass plate adapted to by-pass the flux of said second magnet upon closure of said switch, the arrangement being such that, when the switch is opened upon completion of cooking of the eggs, the valve is opened by virtue of the repulsive force acting between said magnets to thereby allow the cooling water in the water tank to flow into the boiling pot.

6. An automatic electric egg cooker, comprising a boiling pot having a raised portion formed at the center of the bottom surface thereof and a projection formed at the center of the back side of said raised portion, electric heater means for heating said boiling pot; a ferrite having a Curie point approximating the elevated temperature of the boiling pot after water in said boiling pot has been evaporated entirely by being heated by said heating means; a magnet carried on an externally operable lever in opposed relation with said ferrite, switches adapted to open to break the heater circuit when said magnet is moved away from said ferrite, an egg supporting structure and a water tank mounted in said boiling pot; valve means composed of a valve seat structure and a valve, said valve seat structure including a flare surrounding the lower portion of said water tank and having its edge abutting against a cover for said boiling pot, rocking motion preventive legs adapted to be guided by said raised portion of the boiling pot, and a plurality of radial fins formed on the inner wall surface thereof and having the spaces between the top edges of adjacent ones covered so as to define a valve port and said valve being adapted to open and close said valve port; a ferrite having a Curie point lower than the operating temperature of said switches, a magnet having its flux by-passed by said ferrite and fitted to the outer bottom surface of the boiling pot together with said ferrite by being guided by said projection of the boiling pot; a magnet arranged opposite to said first magnet in such a manner that the same poles are located on the same side and operatively associated with said valve of the valve means; a by-pass plate adapted to by-pass the flux of said second magnet upon closure of said switches and to move upon opening of said switches; and a heat-shielding element adapted to cover the upper surface of said raised position of the boiling pot when the water tank is mounted on the boiling pot; the arrangement being such that, when the switches are opened upon completion of cooking of the eggs, the valve is opened by virtue of the repulsive force acting between said magnets to thereby allow the cooling water in the water tank to flow into the boiling pot.

References Cited
UNITED STATES PATENTS

| | | | |
|---|---|---|---|
| 1,913,442 | 6/1933 | Hanks. | |
| 2,518,566 | 8/1950 | Osterheld | 99—440 |
| 2,624,266 | 1/1953 | Colburn et al. | 99—252 |
| 2,761,375 | 9/1956 | Jepson | 99—331 XR |
| 2,807,701 | 9/1957 | Conlin et al. | |
| 3,147,689 | 9/1964 | Sakamoto et al. | 99—331 |

BILLY J. WILHITE, *Primary Examiner.*